United States Patent [19]

Nishimura et al.

[11] Patent Number: 5,203,637
[45] Date of Patent: Apr. 20, 1993

[54] CAP FOR WRITING IMPLEMENT WITH AIR VENT AND GUIDE

[75] Inventors: Kazuya Nishimura; Masayuki Hasegawa, both of Nagoya, Japan

[73] Assignee: Shachihata Industrial Co., Ltd., Japan

[21] Appl. No.: 826,853

[22] Filed: Jan. 28, 1992

[30] Foreign Application Priority Data

Jan. 31, 1991 [JP] Japan ................. 3-9583[U]
Jan. 31, 1991 [JP] Japan ................. 3-9584[U]

[51] Int. Cl.⁵ .............................................. B43K 9/00
[52] U.S. Cl. .................................. 401/202; 401/213; 401/243; 401/247
[58] Field of Search ................. 401/202, 213, 243, 247

[56] References Cited

U.S. PATENT DOCUMENTS

| 5,000,603 | 3/1991 | Isoda | 401/243 X |
| 5,051,015 | 9/1991 | Moeck | 401/243 X |

FOREIGN PATENT DOCUMENTS

| 2509978 | 9/1976 | Fed. Rep. of Germany | 401/243 |
| 3817248 | 10/1989 | Fed. Rep. of Germany | |
| 3821195 | 8/1990 | Fed. Rep. of Germany | |
| 922826 | 6/1947 | France | 401/246 |
| 992128 | 10/1951 | France | 402/244 |
| 1-157898 | 6/1989 | Japan | |
| 1-169384 | 11/1989 | Japan | |
| 1-169385 | 11/1989 | Japan | |
| 1-169386 | 11/1989 | Japan | |
| 2-58981 | 4/1990 | Japan | |
| 2174374 | 11/1986 | United Kingdom | |
| 2220199 | 1/1990 | United Kingdom | |

*Primary Examiner*—Steven A. Bratlie
*Attorney, Agent, or Firm*—Mason, Fenwick & Fenwick

[57] ABSTRACT

A cap for a writing implement comprises an outer cap having open top and bottom ends with an inner cap having at its top a closed end and at its bottom an open end and coaxially connected to the outer cap by means of a plurality of radially extending ribs to define openings between the outer and inner caps. Flange elements are disposed below the openings for preventing the writing tip from entering the openings and guiding it toward the inner cap, the flange opening elements being circumferentially spaced apart from one another by means of slits in alignment with the ribs.

2 Claims, 4 Drawing Sheets

CAP FOR WRITING IMPLEMENT WITH AIR VENT AND GUIDE

This invention relates to a cap for writing implements such as drawing pens, ball point pens, felt tip pens or the like.

BACKGROUND OF THE INVENTION

A cap with or without a clip is provided on a writing implement to enclose the writing tip for its protection. When using the writing implement, an infant or child can place it in his or her mouth and accidentally swallow it. In that event, the cap without the clip can not define any air passage in the throat, resulting in the risk of asphyxiation.

The inventors are aware of (A) Japanese patent public disclosure Heisei 1-157898, (B) Japanese utility modele public disclosure Heisei 1-169384, (C) Japanese utility modele public disclosure Heisei 1-169385, (D) Japanese utility modele public disclosure Heisei 1-169386, (E) UK patent application BG 2174374 A, (F) Japanese utility modele public disclosure Heisei 2-58981, (G) Offenlegungsschrift DE 3817248, (H) Offenlegungsschrift DE 3821195 which proposed to reduce or eliminate the abave-mentioned disadvantages.

Application (A) discloses a cap having air passages formed in a portion protruding radially outwardly of the outer cylindrical surface thereof. This arrangement of the cap has an disadvantage that the cap has a larger external dimension and much more material is required for molding of the cap, resulting in a high cost of production. In addition, the air passages are in an elongated form which may encounter a difficulty in molding.

Application (B) discloses a cap comprising separate outer and inner caps connected to each other at the top of the outer cap. This arrangement leads to a high cost of production due to the fact that there is a need of separately molding the outer and inner caps.

Furthermore, upon fitting the cap over the writing implement, the writing tip is liable to enter an annular space defined between the outer and inner caps, leading to damage thereto.

Application (C) discloses a cap having longitudinal grooves formed in an inner cap on its outer surface. With this arrangement, a thicker wall of the cap is required, resulting in a high cost of production.

Application (D) has substantially the same disadvantage as Application (B).

UK Application (E) discloses a cap having slots formed therein adjacent the open end. This arrangement has the disadvantage that the writing tip is liable to enter the slots in fitting the cap thereover.

Each of Applications (F) and (G) discloses a cap having air passages defined between an outer and an inner cap and opening adjacent the open end thereof. With this arrangement, the writing tip has the risk of entering the air passages.

Application (H) has a disadvantage that a structure of the mold to be used for molding of the cap becomes complicated.

SUMMARY OF THE INVENTION

An object of this invention is to provide a cap for writing implements having air passages formed therein and arranged to prevent the writing tip from entering the air passages in fitting the cap over the writing implement.

This object is achieved by providing a cap for a writing implement comprising an outer cap having open top and bottom ends and an inner cap having at its top a closed end and at its bottom an open end and coaxially connected to the outer cap by means of a plurality of radially extending ribs to define openings between the outer and inner caps, characterized by flange elements disposed below the openings for preventing the writing tip from entering the openings and guiding it toward the inner cap, the flange elements being circumferentially spaced apart from one another by means of slits in alignment with the ribs.

In a preferred embodiment of the invention, each of the flange elements extends obliquely upwardly from the inner surface of the outer cap toward a position below the open end of the inner cap to define an annular space between the open end of the inner cap and the inner edges of the flange elements.

In another preferred embodiment of the invention, each of the flange elements extends obliquely downwardly from the open end of the inner cap toward the inner surface of the outer cap to define an annular space between the inner surface of the outer cap and the outer edges of the flange elements.

DESCRIPTION OF THE DRAWINGS

The advantages of the present invention will be apparent from the following description taken in conjunction with the drawings wherein.

DESCRIPTION OF PREFERRED EMBODIMENTS

Figure 1:
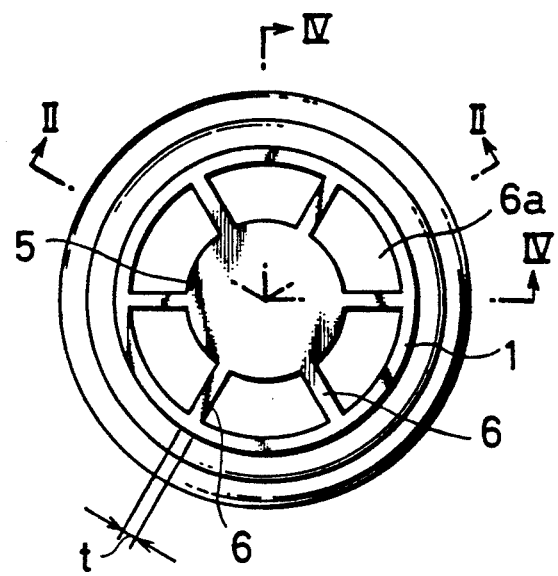
FIG. 1 is a top plan view of a cap in accordance with this invention.
Figure 2:
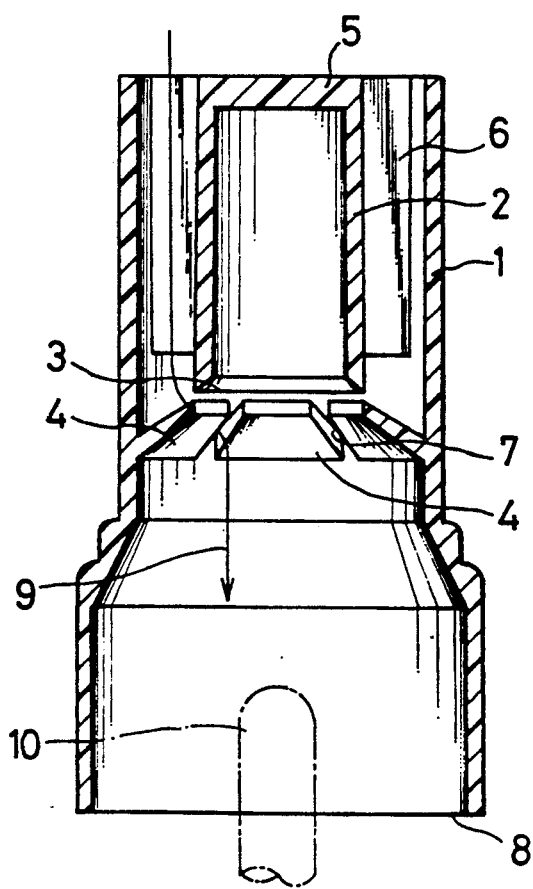
FIG. 2 is a vertical sectional view of the cap taken on line II—II of FIG. 1 and showing in a dotted line a felt marking tip.
Figure 3:
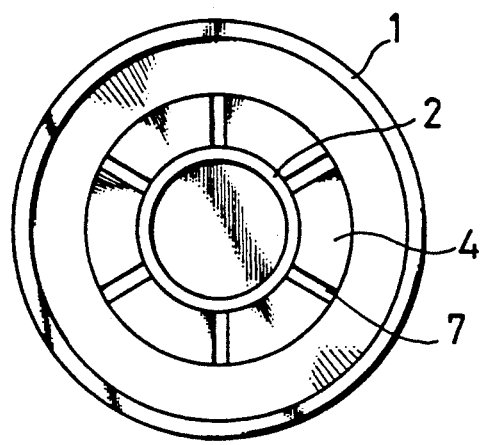
FIG. 3 is a bottom plan view of the cap.

Referring to FIGS. 1, 2 and 3 of the drawings, a cap in accordance with this invention comprises an outer cap 1 having open top and bottom ends and an inner cap 2 having at its top a closed end 5 and at its bottom an open end 3 and disposed coaxially within the outer cap 1. The outer and inner caps 1 and 2 are connected to each other by means of a plurality of radially extending ribs 6 to define openings 6a between the outer and inner caps 1 and 2. Flange elements 4 are formed integrally with the outer cap 1 below the openings 6a and extends obliquely upwardly from the inner surface of the outer cap 1 toward a position below the open end 3 of the inner cap 2 to define an annular space between the open end of the inner cap and the inner edges of the flange elements 4. The flange elements serve to prevent a writing tip 10, as indicated in a dotted line in FIG. 2 from entering the openings 6a and guide it toward the inner cap. The flange elements 4 are circumferentially spaced apart from one another by means of slits 7 which have a width (for example, larger than 0.3 m/m) corresponding to thickness of the ribs 6, the maximum value of the width depending on a diameter of the writing tip of the implement so that the writing tip 10 is not damaged due to its engagement with the slits 7. Each of the slits 7 is in alignment with each of the ribs 6.

Figure 4:
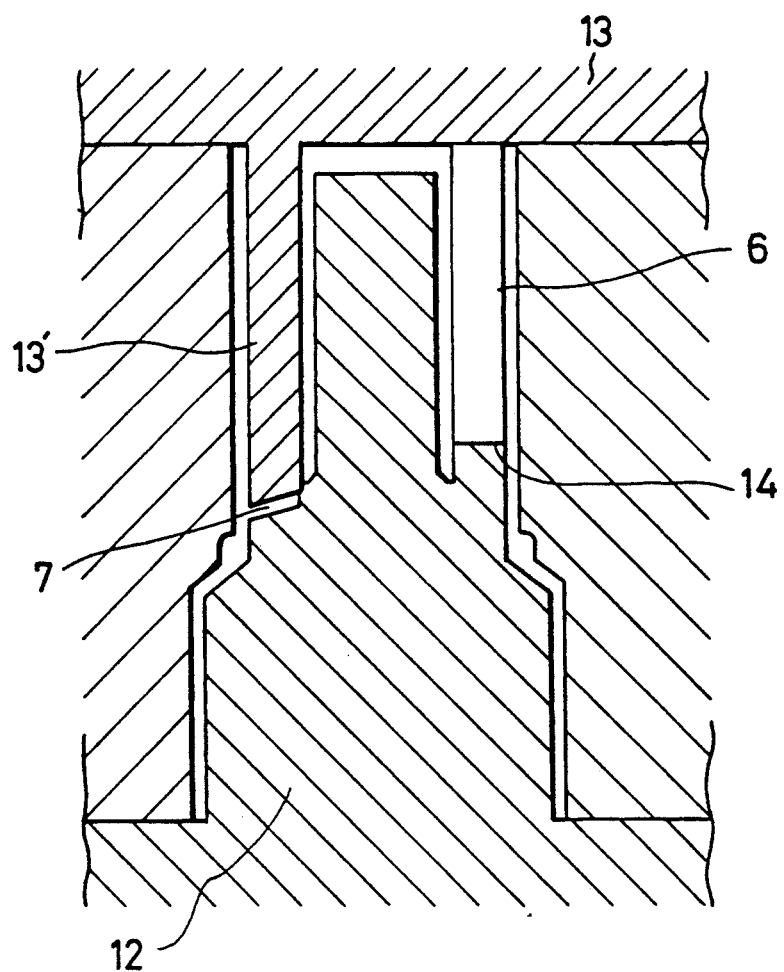
FIG. 4 is a vertical sectional view of a mold used to mold the cap in accordance with the present invention and taken on line IV—IV of FIG. 1.

As can be seen in FIG. 4, a lower core pin 12 is inserted in an outer mold from the side of the open end of the cap and provided with vanes 14 for defining the slits 7 and the lower end faces of the ribs 6 while an upper core pin 13 is inserted in the outer mold from the side of the closed end of the inner cap and provided with pin elements 13' for defining the ribs 6 and the openings 6a. This arrangement of the mold makes it possible to integrally mold the cap including the outer and inner caps in accordance with the invention. Materials which can be used to mold the cap in accordance with the invention may comprise thermoplastic resins, such as polypropylene, nylon, polyoxymethylene or the like and thermosetting resins, such as urea resin, phenolic resin, polybutyl-phthalate or the like.

With this arrangement of the cap, air flows through the openings 6a and slits 7 as indicated by arrow 9 so that one can inhale in the event of the cap being accidentally swallowed. When the cap is fitted over the writing implement from the open end 8 thereof, the writing tip 10 can be inserted into the inner cap 2 to protect it. The inclined surfaces of the flange elements 4 serve to guide the writing tip toward the open end of the inner cap 2 when the writing tip engages the flange elements 4. Since the width of the slit 7 between the adjacent flange elements 4 is less than the diameter of the writing tip, the latter can be smoothly guided along the inclined surfaces of the flange elements even when encountering the slit.

Figure 5:
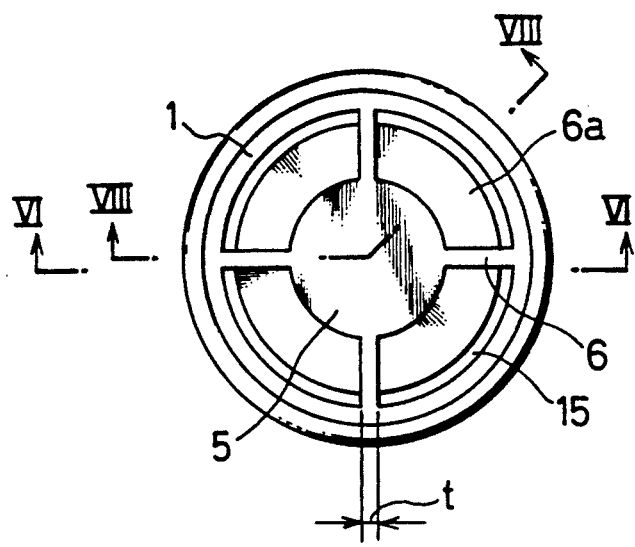
FIG. 5 is a top plan view of a cap in accordance with another embodiment of this invention.
Figure 6:
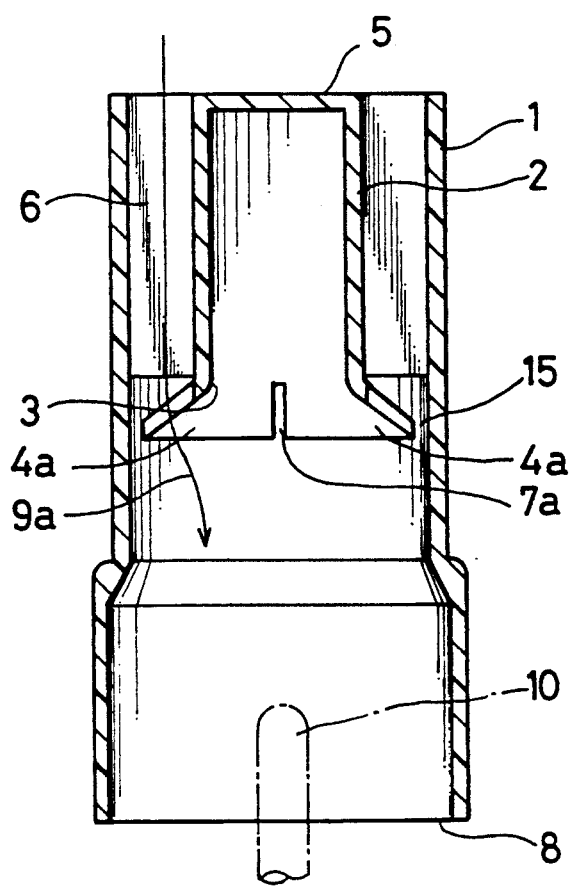
FIG. 6 is a vertical sectional view of the cap taken on line VI—VI of FIG. 5 and showing in a dotted line a felt marking tip.
Figure 7:
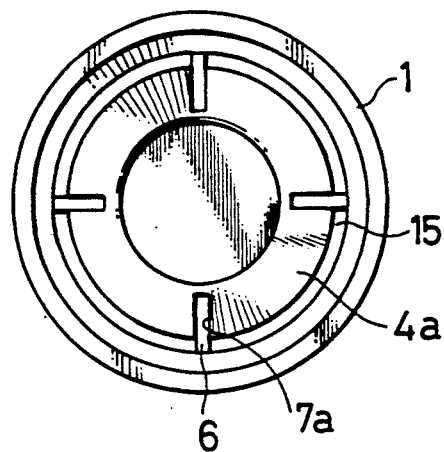
FIG. 7 is a bottom plan view of the cap.

Referring to FIGS. 5, 6 and 7 of the drawings, there is shown another embodiment of this invention, in which a cap is substantially identical to that described with reference to FIGS. 1 through 3 with the exception that a plurality of flange elements 4a extends obliquely downwardly from the open end 3 of the inner cap 2 toward the inner surface of the outer cap 1 to define an annular space 15 between the inner surface of the outer cap 1 and the outer edges of the flange elements 4a. The flange elements 4 are circumferentially spaced apart from one another by means of slits 7a having the same dimension as in the embodiment of the invention shown in FIGS. 1 to 3. Each of the slits 7a is in alignment with each of the ribs 6.

Figure 8:
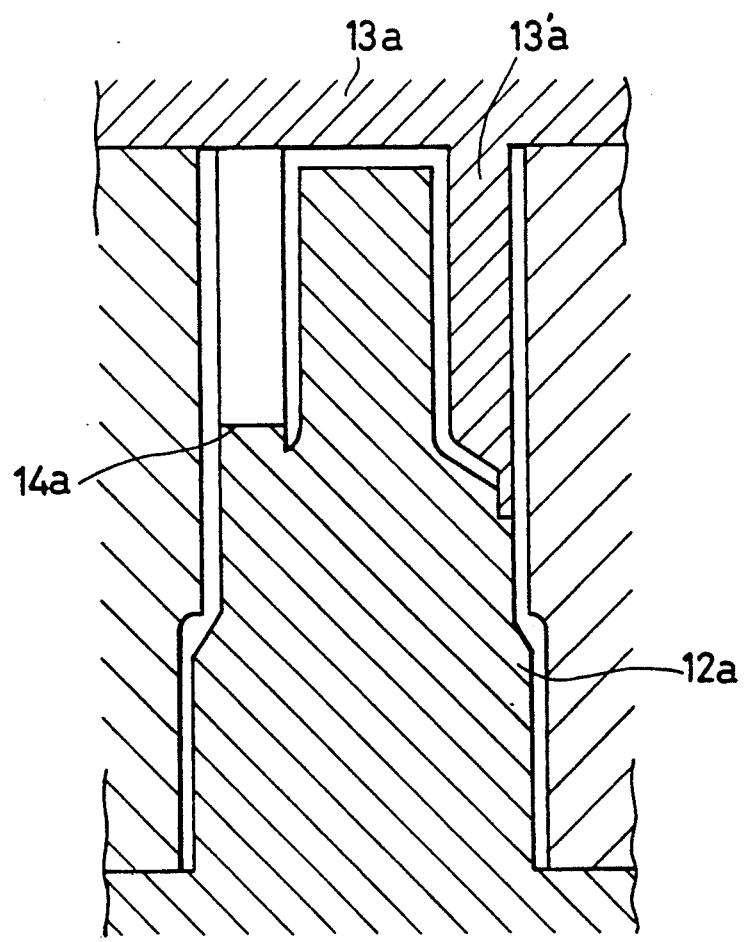
FIG. 8 is a vertical sectional view of a mold used to mold the cap in accordance with the present invention and taken on line VIII—VIII of FIG. 5.

As can be seen in FIG. 8, a lower core pin 12a is inserted in an outer mold from the side of the open end of the cap and provided with vanes 14a for defining the slits 7 and the lower end faces of the ribs 6 while an upper core pin 13a is inserted in the outer mold from the side of the closed end of the inner cap and provided with pin elements 13a' for defining the ribs 6 and the openings 6a. This arrangement of the mold makes it possible to integrally mold the cap including the outer and inner caps in accordance with the invention.

With this arrangement of the cap, air flows through the openings 6a and through the slits 7a as well as the annular space 15 as indicated by arrow 9a so that one can inhale in the event of the cap being accidentally swallowed. When the cap is fitted over the writing implement from the side of the open end 8 thereof, the writing tip 10 can be inserted into the inner cap 2 to protect it. The inclined surfaces of the flange elements 4a serve to guide the writing tip 10 toward the open end 3 of the inner cap 2 when the writing tip engages the flange elements 4a. Since the width of the slit 7a between the adjacent flange elements 4a is less than the diameter of the writing tip as described hereinbefore, the latter can be smoothly guided along the inclined surfaces of the flange elements even when encountering the slit 4a.

Some modifications and equivalents which fall within the spirit of the invention are considered a part thereof.

What is claimed is:

1. A cap for a writing implement having a writing tip, comprising:

an outer cap having open top and bottom ends and an inner surface;

an inner cap having at its top a closed end and at its bottom an open end;

a plurality of ribs extending radially extending from said inner cap and coaxially connecting said inner cap to said outer cap, said ribs defining therebetween a plurality of openings between said inner and outer caps; and guide means for preventing the writing tip of the writing implement from entering said openings and for guiding the writing tip toward said inner cap, said guide means comprising a plurality of flange elements disposed below corresponding ones of said openings, said flange elements having inner edges, said flange elements extending obliquely upwardly from said inner surface of said outer cap toward a position below said open end of said inner cap to define an annular space between said open end of said inner cap and said inner edges of said flange elements, and said flange elements being circumferentially spaced apart from one another to define a plurality of slits in alignment with said ribs, said slits defining with said annular space and said openings an air passage from the interior of said inner cap to the exterior of said outer cap.

2. A cap for a writing implement having a writing tip, comprising:

an outer cap having open top and bottom ends and an inner surface;

an inner cap having at its top a closed end and at its bottom an open end;

a plurality of ribs extending radially extending from said inner cap and coaxially connecting said inner cap to said outer cap, said ribs defining therebetween a plurality of openings between said inner and outer caps; and guide means for preventing the writing tip of the writing implement from entering said openings and for guiding the writing tip toward said inner cap, said guide means comprising a plurality of flange elements disposed below corresponding ones of said openings, said flange elements having outer edges, said flange elements extending obliquely downwardly from said open end of said inner cap toward said inner surface of said outer cap to define an annular space between said inner surface of said outer cap and said outer edges of said flange elements, and said flange elements being circumferentially spaced apart from one another to define a plurality of slits in alignment with said ribs, said slits defining with said annular space and said openings an air passage from the interior of said inner cap to the exterior of said outer cap.

* * * * *